United States Patent [19]

Coral

[11] 4,158,462

[45] Jun. 19, 1979

[54] LOCALIZED SUCTION DEVICE WITH A SUCKING INLET HEAD CARRIED BY A TUBULAR DUCT END ORIENTABLE IN SPACE

[75] Inventor: Nevio Coral, Leini, Italy

[73] Assignee: Coral S.A.S. di Nevio Coral, Turin, Italy

[21] Appl. No.: 747,106

[22] Filed: Dec. 3, 1976

[30] Foreign Application Priority Data

Dec. 4, 1975 [IT] Italy .............................. 69992 A/75
Apr. 7, 1976 [IT] Italy .............................. 67818 A/76

[51] Int. Cl.² .................................................. F16L 27/00
[52] U.S. Cl. ...................................... 285/168; 285/61; 285/184; 285/283; 285/226
[58] Field of Search ................. 285/164, 168, 114, 61, 285/184, 264, 265, 226, 283; 141/387

[56] References Cited

U.S. PATENT DOCUMENTS

| | | | |
|---|---|---|---|
| 1,165,449 | 12/1915 | Rietz | 285/226 |
| 2,739,779 | 3/1956 | Krone et al. | 285/184 X |
| 3,638,973 | 2/1972 | Poletti | 285/164 |
| 3,845,975 | 11/1974 | Heijst | 285/283 |
| 3,892,430 | 7/1975 | Gaag | 285/283 |
| 3,951,165 | 4/1976 | Seger | 285/114 |

*Primary Examiner*—Dave W. Arola
*Attorney, Agent, or Firm*—Browdy and Neimark

[57] ABSTRACT

A device which is to constitute a tubular duct includes a plurality of flexible tubular sections and a plurality of rigid tubular sections. Articulation units are provided between one section and the next. Each articulation unit includes a pair of brackets provided with fastening collars. The respective collars are secured to ends of the rigid sections, ends of a respective flexible section being mounted on skirts of the adjacent rigid sections. The brackets of each pair of brackets are pivotally connected to move about a first respective axis. At least one bracket of at least one pair is additionally mounted to pivot about an axis perpendicular to the first axis.

6 Claims, 15 Drawing Figures

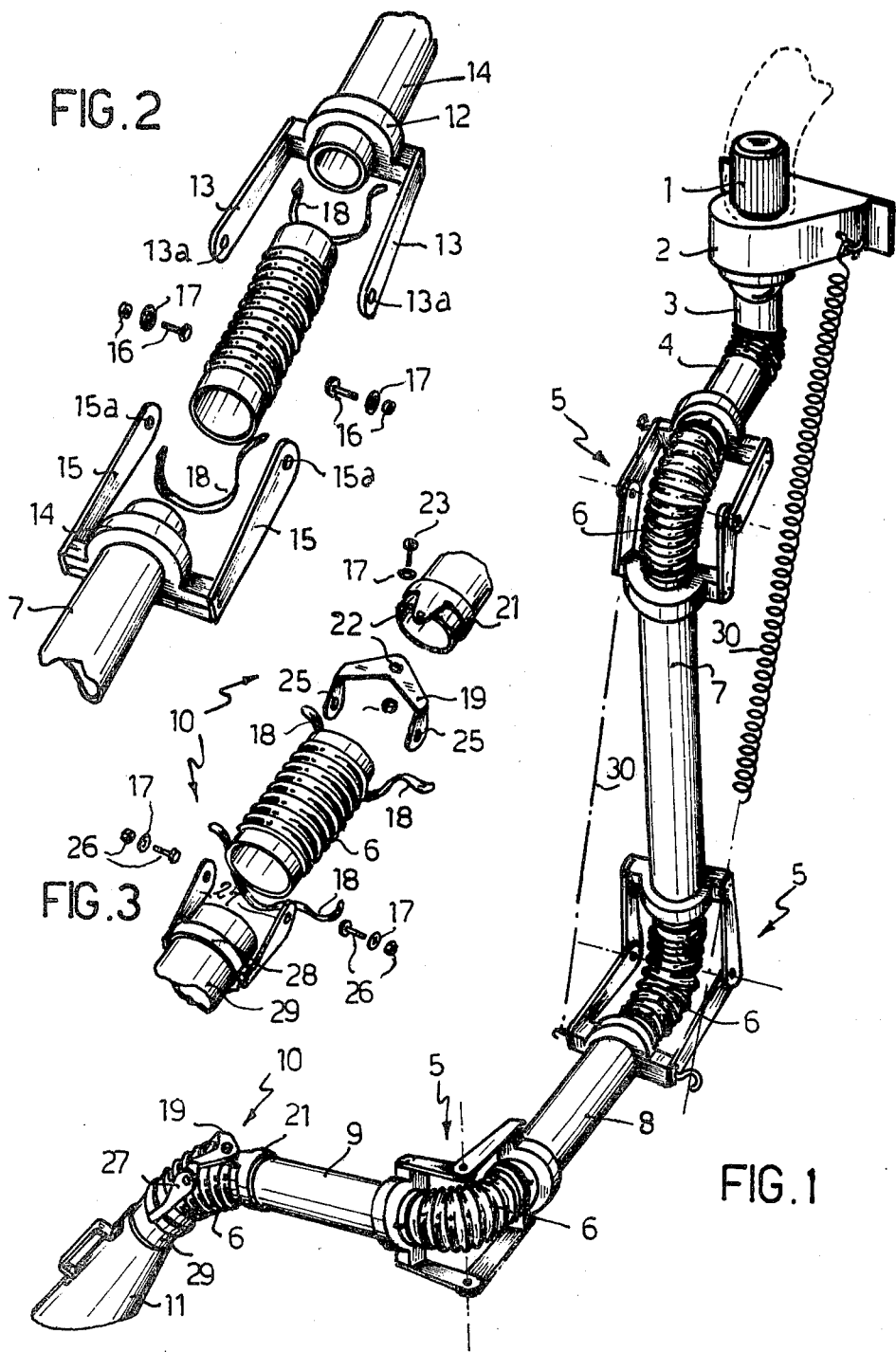

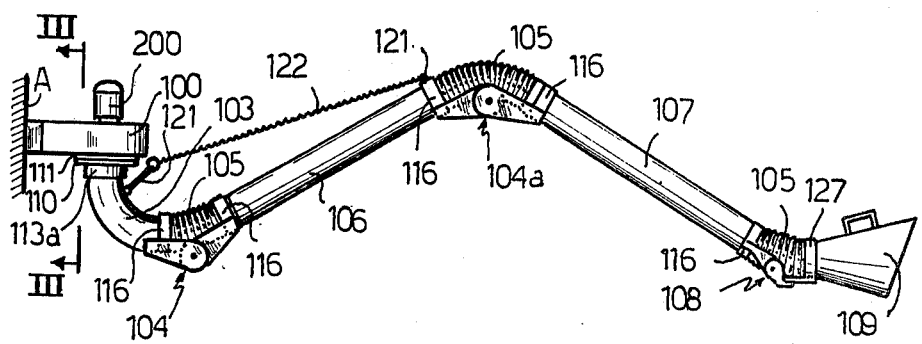
FIG. 4
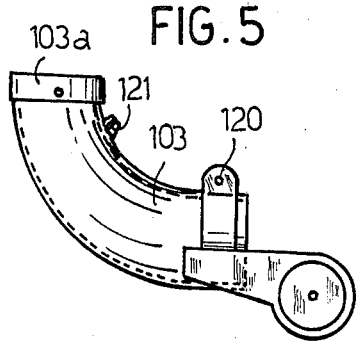
FIG. 5
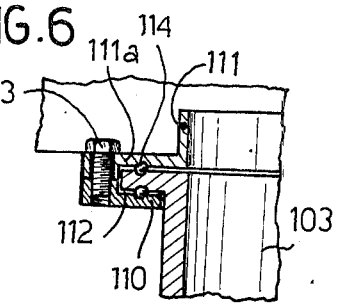
FIG. 6
FIG. 8
FIG. 7
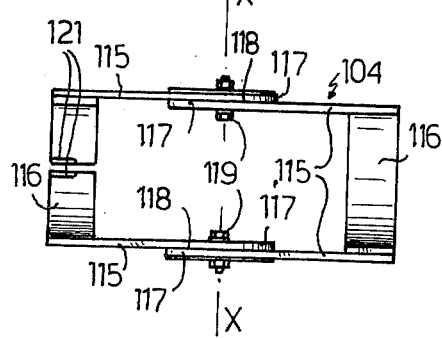

LOCALIZED SUCTION DEVICE WITH A SUCKING INLET HEAD CARRIED BY A TUBULAR DUCT END ORIENTABLE IN SPACE

BACKGROUND OF THE INVENTION

Many industrial processings require operations, as the welding, during which harmful vapours gases, dusts and/or smokes are developed which pollute the working ambient.

Localized suction devices for removing vapours, gases, dusts and/or smokes are known which however do not always perfectly accomplish the exact task for which they are used.

The known prior art provides also localized suction devices including an orientable and flexible tubular branch respectively connected at its ends to a sucking motor/fan group and to a sucking inlet head, in order to orientate the latter with respect to the source of dust, gas smoke, vapours and/or the like.

The above-mentioned known suction devices comprise a flexible pipe or hose having a non-self-supporting structure and pivoted arms which are balanced by elastic means located within the pipe or hose.

The known devices of the type mentioned above have a number of drawbacks. Firstly, the inner cross-section area of the tubular branch which conveys the smokes, vapors, ducts and gases is partially obstructed by the presence of the articulated support.

Secondly, the articulation of the arms forming the support, comprises oscillation pivots and balancing springs which are subjected to vapours which are often acid and corrosive and therefore compromise their functionality.

Furthermore, suction devices of the above-mentioned type have a fixed pre-established length.

SUMMARY OF THE INVENTION

The primary object of present invention is to provide an efficient and reliable suction device which may be orientated with respect to localized sources of gases, dusts, smokes and/or vapours, wherein the whole inner area of the device tubular duct cross section, is useful and clear of any obstacle.

Another object of present invention is to provide a suction device, as above said, anyhow orientable in the space, and provided with a unified and simple type of articulation.

A further object of present invention is to provide a localized suction device whose length if desired may, be varied according to the possible variation of the smoke vapours, dust or gas source location, by lengthening or shortening the orientable tubular duct with the increase or the reduction of the number of unified members forming it.

The suction device according to the invention which achieves the above stated objects is characterized in that its tubular duct to convey the smokes vapours or gases is formed by two or more rigid tubular sections which are joined one to another by flexible tubular sections, and toggle joints are mounted in correspondence with the flexible tubular sections, the toggle joints being fixed to end collars which may be tightened about the ends of the adjacent rigid tubular sections, while balancing elastic means are provided outside the so formed duct. In accordance with a structural variant in order to minimize the external encumbrance of the articulation means and, in the same time, to provide sealed junctions between the flexible and rigid sectors of the duct, the device assumes such technical features as to enlarge the range of its possible use which thereby extends, as is to be described below, to a plurality of other fields besides that of the localized suction.

The device according to the improvement, besides the localized suction function may be advantageously used as:
- a localized air and gas blower, in general
- an orientable duct for fluid (in general) suction and delivery;
- a bearing and protective envelope for appropriately insulated electrical cables, intended e.g. to be connected to machines or machine parts which must effect programmed movements of a limited amplitude; a container for water, air and cable ducts in general; and finally, if made of a transparent material, a sheat to contain electrical lamps to form luminous tubular section.

FIG. 1 is a perspective view of an exemplary device according to the present invention;

FIGS. 2 and 3 are perspective views showing details of the device of FIG. 1.

FIG. 4 is a side view, in a reduced scale, illustrating a preferred embodiment of an improved device according to the present invention.

FIG. 5 illustrates in a different scale a detail of a preferred embodiment of a device according to the present invention;

FIG. 6 is a cross section partial view along line III—III of FIG. 4;

FIGS. 7 and 8 are respectively a side view and a plan view of a practical form of one of the articulation which can be used in devices according to the present invention;

DETAILED DESCRIPTION OF THE PREFERRED EMBODIMENTS

Figure 9:
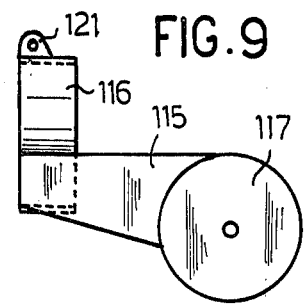
FIGS. 9 and 10 are respectively a side and a front view of a bracket with collar comprised in an articulation type.

As shown in the drawing, FIGS. 1 to 3, the device comprises an electric motor 1 connected to a sucking fan enclosed within a depression chamber 2, a rigid tubular elbow 3,4 which can rotate around a vertical axis with respect to said chamber is mounted to the same and connected, at its other end, to a first rigid tubular branch 7, through a corrugated flexible tube section 6 and an articulated support, generally indicated by 5.

Similarly, the tubular branch 7 is connected to a second rigid tubular branch 8 and, if desired, to subsequent analogous tubular branches 9, etc.

Each support 5, as shown in FIG. 2, comprises a pair of collars 12, 14 provided with pairs of respective parallel and juxtaposed arms 13 and 15 whose ends 13a and 15a are articulated by pivots 16 with the interposition of friction washers 17. The collars 12, 14 made of one or two parts, are engaged on the skirt of the rigid tubular sections 4, 7—7, 8 etc. and they preferably lock edges 6a, of the corresponding flexible tube sections 6, on the skirt of the rigid tubular branches 4, 7, 8 etc. Hose clamps 18 may be used to make the disassembly of the flexible tubular sections 6 independent from collars 12, 14 of the articulations 5.

The last rigid tubular section of the suction duct which in the represented case is indicated by 9, carries an articulation 10 allowing the movement with respect to two axes perpendicular one another, so that the sucking inlet head 11 may be universally orientated.

The articulation 10 as best seen in FIG. 3, comprises a collar 21 articulated at 22 by a bolt 23 with nut 24 and a friction washer 17 in the middle of bracket 19 which with its fork arms 25 is in turn articulated, by bolts and nuts 26 onto branches 27 carried by collar 28 tightened on the skirt of the cylindrical tubular section 29 connected to the sucking inlet head 11.

Traction elastic means 30 suitably anchored to fixed and mobile points of the suction device, balance its weight for any position imposed to the device.

As represented in FIG. 1, the suitable orientation of the various articulation 6 oscillation axis allows the tubular duct to assume in the space any desired movement and displacement and this permits the use of the device even in limited spaces, between fixed obstacles.

Due to the described structure, the suction duct of the device is completely free—the members forming its articulation are on the outside with respect to the port of the tubular duct which may be quickly lengthened or shortened, while the sucking inlet head 11 may be anyhow orientated and directed.

Referring to FIG. 4 a preferred embodiment of the improved device, according with a variant, comprises a box-shaped wall bracket 100 suitably anchored to a fixed point A and possibly containing a suction or blower fan, according to the particular use of the device as a localized suction or an air or gas blower.

When the device is used for various functions the fan is absent. Numeral 200 indicated an electrical motor which may be installed to activate the fan when this is present.

A collar 100 with a flange 111a and coupled to a ring 110, by bolts 113 is connected to the wall bracket 100 (FIG. 6); the flange 111a and ring 110 are provided with sliking means 114 interposed between said collars and flange 112 of the tubular elbow 103 which, obviously, may have any curvature radius different than the presented one.

The free end of elbow 103 (FIG. 4) is inserted into one end of a flexible tube section 105 whose opposed end is coupled to the rigid tubular section 106. The rigid tubular section 106 is coupled to a second rigid tubular section 107 through a second flexible tube section 105.

In the presented case, the rigid tubular section 107 is connected to a substantially bell-shaped mouth 109 through a further flexible tube section.

At each connection point between rigid and flexible tubular sections, articulation means 104, 104a are mounted which, in the case represented by FIG. 4, are different from the articulation mounted between the last rigid tubular section 107 and the bell-shaped mouth 109.

As presented in FIGS. 7 and 8 each articulation 104 comprises a pair of brackets 115 integral with cylindrical collars 116 the free ends of brackets 115 terminate with integral disks 117 having a central hole.

Each pair of brackets 115 forming one articulation is mounted as represented on FIG. 8; between each opposed pair of disks 117 is interposed a friction disk 118 of "ferodo" or other proper material and bolts 119 with relative nuts tighten the opposed pairs of disks 117 in order to provide friction articulated joints around axis x—x between the two brackets 115 of each articulation 104.

Figure 10:
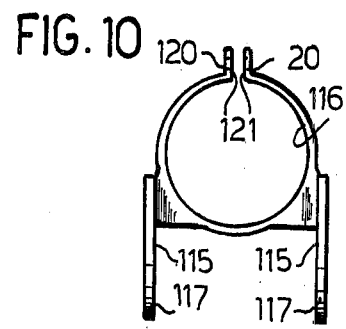
Figure 11:
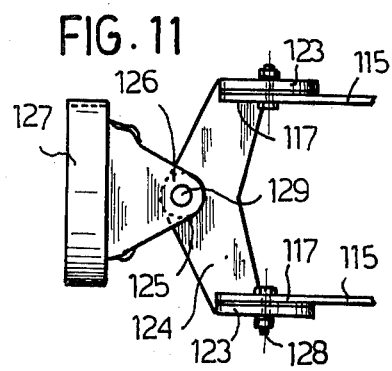
FIGS. 11 to 15 illustrate a different articulation embodiment and some of its parts.
Figure 12:
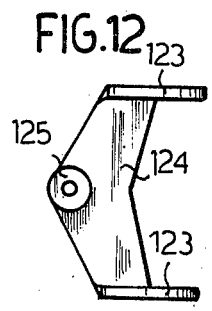
Figure 13:
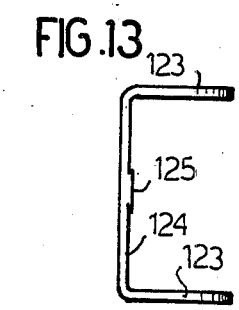
Figure 14:
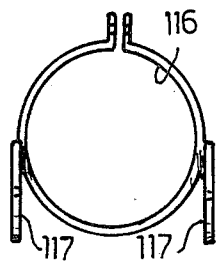
Figure 15:
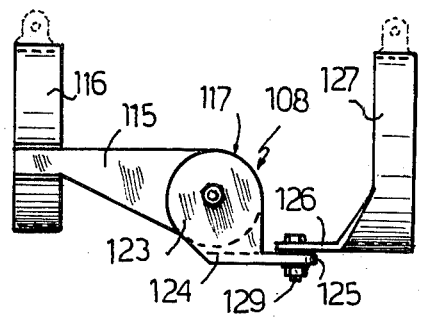

As represented in FIG. 10, each collar 116 may be provided with ears 121 having coaxial holes 120 for a locking bolt which is not represented.

All or some of said collars 116 are further provided with ears 121 (FIGS. 4,7,9) for the anchorage of balancing springs 122 co-operating with frictions 117,118.

As represented on FIGS. 11 to 15, the articulations between consecutive rigid tubular elements may comprise a collar 116 with parallel branches 115 and terminal disks 117 friction coupled to analogous disks 123 of a bracket 124 which, in turn, is articulated at 125 on a bracket 126 with collar 127. The axis of articulations 128 and 129 (FIGS. 11, 15) result normal one another and therefore the collars 116 and 127, mutually joined by a flexible tube section and connected to rigid tubular sections and/or to last rigid tubular section 107 and the bell-shaped mouth 109 result connected by an universal joint and anyhow orientable in the space.

Collars 116, 127 tighten, preferably, the ends of the flexible tube sections 105 onto the skirt of the rigid tubular sections.

The ends of said flexible tubular sections 105, may further be anyhow fixed with respect to the rigid tubular sections, while the articulation means between the various rigid elements, due to their structure, may be so mounted as to result placed both in correspondence with the maximum curvature radius of the flexible tubular sections (articulations 104 and 108 FIG. 4) and in correspondence with the minimum curvature radius (articulation 104a, FIG. 4).

From the so far made description, it results clearly that by effecting sealed junctions between the rigid and the flexible tubular elements and opportunely using the two articulation types described, it is possible to provide partially flexible devices, anyhow orientable in the space, substantially characterized in that:

Whatever may be the use of the device, its inner port is wholly free because the articulation means and the balancing elastic means are mounted outside;

By locking the frictions of the various articulations it is possible to provide self-supporting ducts anyhow oriented in the space;

By selecting suitable materials for the rigid and the flexible tubular sections, as it has been mentioned in the premise, the duct according to the invention is advantageously used in suction or delivery installations for gas, air and fluids in general; in suction installations for smokes, vapours, dusts, produced by certain working cycles, as the grinding.

The device may be also used to contain electric cables, tubes of rubber or other material, as the tubes for the oxyacetylene welding.

By opportunely selecting the diameter of the rigid and the flexible tubular sections, the device according to the invention may be advantageously used for combined uses, as e.g. cable or flexible tube carrier and, in the same time, as an air suction or blower device.

It may even be used as a light diffuser by making it wholly or partially in a suitable transparent material and including within the tubular passage electric light sources as fluorescent lamps or tubes.

A further advantageous use of the device is that with a sucking bell-shaped mouth (11, 109) made with a suitable flat transparent material and using the sucking device for welding, said bell-shaped mouth replaces and eliminates the tack die normally used by operator.

It is obvious that, particularly, the articulation means used between the different elements of the device are not strictly limited to the improvement described and represented rather that they comprise any analogous or equivalent solution suitable to connect all flexible tubular sections to all rigid tubular sections anyhow orientable in the space transfering, in case, described or equivalent articulations means into inner of rigid tubular sections.

I claim:

1. A device suitable to constitute at least a portion of tubular duct means comprising a plurality of rigid tubular sections and a plurality of unitary flexible tubular sections, the rigid tubular sections being alternated with the flexible tubular sections, articulation means including respective pairs of brackets provided with fastening collars securing them respectively onto portions of respective ones of said rigid tubular sections in the vicinity of and spaced from ends thereof and on whose respective skirts defined by surfaces between said ends and respective ones of said fastening collars are connected opposite ends of an intermediate flexible tubular section of said plurality of unitary flexible tubular sections, each articulation means having at least one pivotal friction connection means between brackets of each of said pair of brackets which connection means defines a respective first axis, and wherein at least one of said articulation means includes means pivotally coupling one of its said fastening collars to one bracket of its said pair of brackets along a second axis substantially perpendicular to said first axis of said at least one articulation means.

2. A device according to claim 1, wherein at least some of said articulation means comprise at least one of said pair of brackets each having a collar integral to a pair of parallel branches ending with coaxial disks, a respective friction element positioned between opposed pairs of said disks of a pair of said brackets to provide a friction produced reaction force upon movement of said disks of said opposed pairs relative to one another.

3. A device according to claim 1, wherein at least one of said articulation means comprises three brackets including two brackets forming one of said pairs of brackets and a third bracket, said third bracket being mutually articulated around two axes normal to one another, intermediate with respect to the other two, lacking a fastening collar and having said other two pivotally connected thereto for respective movement about said two axes normal to one another.

4. A device according to claim 1, wherein each of said articulation means are mounted between respective twos of said rigid tubular sections, are external and leave completely unobstructed the interior of all said tubular sections.

5. A device according to claim 1, further comprising balancing elastic means mounted outside said tubular sections and anchored between fixed and mobile points on the device to aid in balancing its mass in differing orientations.

6. A device according to claim 1, wherein at least one of said articulation means is comprised of a pair of said brackets connected together pivotally about an axis spaced from that one of said flexible tubular sections.

* * * * *